United States Patent
Zhu et al.

(10) Patent No.: US 11,534,741 B2
(45) Date of Patent: Dec. 27, 2022

(54) ORGANIC WASTEWATER TREATMENT METHOD BASED ON MULTI-ELEMENT CO-DOPING TIO2 NANO PHOTOCATALYTIC MATERIAL

(71) Applicant: CQC INTIME TESTING TECHNOLOGY CO., LTD., Suzhou (CN)

(72) Inventors: Yixin Zhu, Suzhou (CN); Jie Wang, Suzhou (CN); Xiyu Song, Suzhou (CN); Yang Zhou, Suzhou (CN); Mei Zhang, Suzhou (CN)

(73) Assignee: CQC INTIME TESTING TECHNOLOGY CO., LTD., Suzhou (CN)

( * ) Notice: Subject to any disclaimer, the term of this patent is extended or adjusted under 35 U.S.C. 154(b) by 12 days.

(21) Appl. No.: 17/596,268

(22) PCT Filed: Sep. 8, 2020

(86) PCT No.: PCT/CN2020/113942
§ 371 (c)(1),
(2) Date: Dec. 7, 2021

(87) PCT Pub. No.: WO2022/047813
PCT Pub. Date: Mar. 10, 2022

(65) Prior Publication Data
US 2022/0266226 A1 Aug. 25, 2022

(30) Foreign Application Priority Data
Sep. 1, 2020 (CN) .......................... 202010903705.X

(51) Int. Cl.
*B01J 23/80* (2006.01)
*C02F 1/72* (2006.01)
(Continued)

(52) U.S. Cl.
CPC ............... *B01J 23/80* (2013.01); *B01J 23/94* (2013.01); *B01J 35/004* (2013.01); *B01J 37/009* (2013.01);
(Continued)

(58) Field of Classification Search
CPC . B01J 35/08; B01J 27/138; B01J 21/06; B01J 27/32; B01J 38/02; C02F 1/30; C02F 1/32; C02F 1/48; C02F 1/72
See application file for complete search history.

(56) References Cited

U.S. PATENT DOCUMENTS

2010/0184592 A1 7/2010 Sepeur et al.
2013/0123093 A1 5/2013 Kim et al.

FOREIGN PATENT DOCUMENTS

CN 101074113 A 11/2007
CN 101157027 A 4/2008
(Continued)

OTHER PUBLICATIONS

Yi Wen-Tao, et al., Preparation and characterization of S/Cu co-doped nano-TiO2 and its photocatalytic property, Chemical Engineering (China), 2013, pp. 62-65,78, vol. 41, No. 4.
(Continued)

*Primary Examiner* — Cameron J Allen
(74) *Attorney, Agent, or Firm* — Bayramoglu Law Offices LLC

(57) ABSTRACT

An organic wastewater treatment method based on a multi-element co-doping TiO$_2$ nano photocatalytic material includes preparing a sulfur-titanium dioxide mixture, hydrothermally reacting the sulfur-titanium dioxide mixture with copper chloride, ammonia, strong alkali, a transition metal salt and the like, reacting the resulting reaction product with hydrofluoric acid, then performing temperature programming thermal treatment in air to obtain the multi-element
(Continued)

co-doping TiO$_2$ nano photocatalytic material, and then treating organic wastewater with the multi-element co-doping TiO$_2$ nano photocatalytic material under the irradiation of visible light. The organic wastewater treatment method is efficient and rapid, safe and environmental-friendly, can thoroughly degrade many types of organic pollutants, ammonia nitrogen and the like, and does not cause secondary pollution; furthermore, the adopted multi-element co-doping TiO$_2$ nano photocatalytic material can be regenerated and recycled only by simple calcination, and the cost is inexpensive.

12 Claims, 1 Drawing Sheet

(51) Int. Cl.
    *B01J 35/00*     (2006.01)
    *B01J 37/04*     (2006.01)
    *B01J 37/03*     (2006.01)
    *B01J 37/02*     (2006.01)
    *B01J 37/00*     (2006.01)
    *B01J 37/06*     (2006.01)
    *B01J 37/08*     (2006.01)
    *B01J 38/12*     (2006.01)
    *B01J 23/94*     (2006.01)
    *C02F 1/32*     (2006.01)
    *C02F 101/16*     (2006.01)
    *C02F 101/30*     (2006.01)
(52) U.S. Cl.
    CPC ......... *B01J 37/0236* (2013.01); *B01J 37/031* (2013.01); *B01J 37/04* (2013.01); *B01J 37/06* (2013.01); *B01J 37/08* (2013.01); *B01J 38/12* (2013.01); *C02F 1/32* (2013.01); *C02F 1/725* (2013.01); *C02F 2101/166* (2013.01); *C02F 2101/308* (2013.01); *C02F 2303/16* (2013.01); *C02F 2305/08* (2013.01); *C02F 2305/10* (2013.01)

(56) References Cited

FOREIGN PATENT DOCUMENTS

| | | |
|---|---|---|
| CN | 101219371 A | 7/2008 |
| CN | 101301619 A | 11/2008 |
| CN | 102500426 A | 6/2012 |
| CN | 102872774 A | 1/2013 |
| CN | 103614759 A * | 3/2014 |
| CN | 104549369 A | 4/2015 |
| CN | 105261483 A | 1/2016 |
| CN | 105664995 A | 6/2016 |
| CN | 106495216 A | 3/2017 |
| CN | 107138161 A | 9/2017 |
| CN | 111111696 A | 5/2020 |
| JP | 2001334148 A | 12/2001 |

OTHER PUBLICATIONS

Chen Zan-Yu, et al., Preparation of fluorine and copper co-doping TiO2 hollow microspheres and its visible light photocatalytic performance, The Chinese Journal of Nonferrous Metals, 2017, pp. 1643-1650, vol. 27, No. 8.

Huang Xianhuai, et al., TiO2 Photocatalytic Technology and Its Application in Environmental Field, Hefei University of Technology Press, 2013, pp. 41-46.

Jinghong Zhang, et al., Photocatalytic removal of chromium(VI) and sulfite using transition metal (Cu, Fe, Zn) Toped TiO2 driven by visible light: Feasibility, mechanism and kinetics, Journal of Industrial and Engineering Chemistry, 2019, pp. 23-32, vol. 80.

* cited by examiner

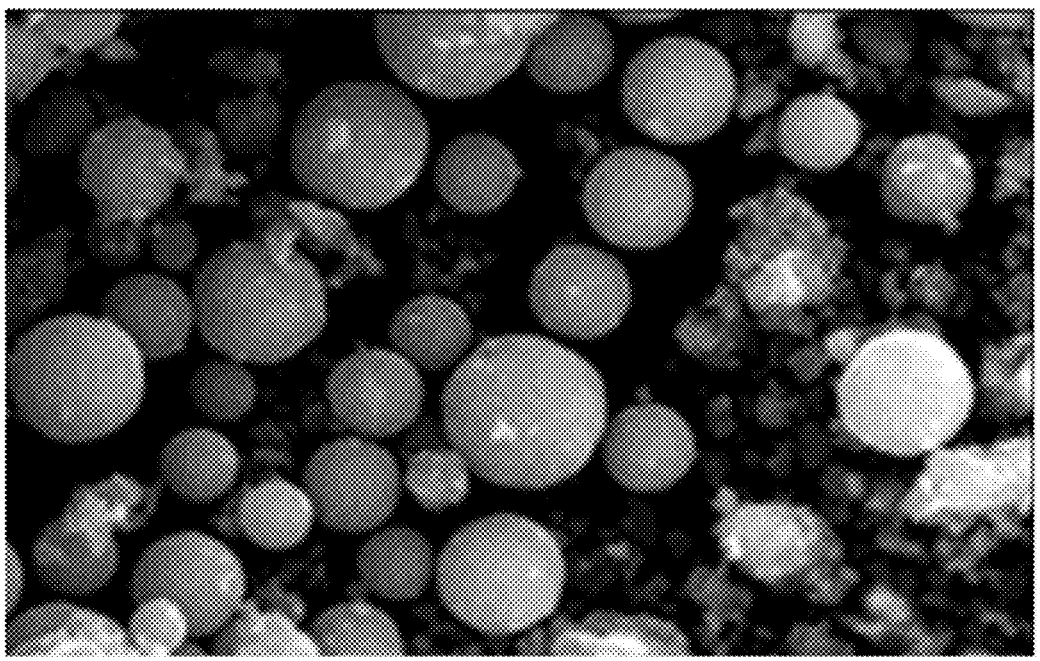

US 11,534,741 B2

ORGANIC WASTEWATER TREATMENT METHOD BASED ON MULTI-ELEMENT CO-DOPING TIO2 NANO PHOTOCATALYTIC MATERIAL

CROSS REFERENCE TO RELATED APPLICATIONS

This application is the national phase entry of International Application No. PCT/CN2020/113942, filed on Sep. 8, 2020, which is based upon and claims priority to Chinese Patent Application No. 202010903705.X, filed on Sep. 1, 2020, the entire contents of which are incorporated herein by reference.

TECHNICAL FIELD

The present application relates to the technical field of catalytic materials, particularly to an organic wastewater treatment method based on a multi-element co-doping $TiO_2$ nano photocatalytic material.

BACKGROUND

Increasingly serious environmental pollution and outburst of energy crisis have attracted attentions from countries in the world. A photocatalytic technology is expected to play a key role in solving environmental pollution and energy crisis. At present, more and more science researchers have been attracted to invest in related researches.

Application of $TiO_2$, as an efficient and nontoxic photocatalyst, has attracted much attentions in the environmental-friendly fields such as wastewater treatment, air purification and antibiosis. The $TiO_2$ photocatalyst has been now referred to as "environmental catalyst". However, some defects of $TiO_2$ limit its practical progress, for example, a band gap can generate activity only by absorbing ultraviolet light due to wide width, and cannot effectively make use of sunlight; in addition, recombination of photogenerated electrons and holes leads to low light quantum efficiency. Therefore, improvement of catalytic efficiency of visible light by modification has become a research hotspot. In recent years, people attempt to use nonmetallic ion doping, metal doping, noble metal deposition, dye sensitization, semiconductor recombination and other manners to modify $TiO_2$ so as to improve absorption of $TiO_2$ on visible light and its photocatalytic efficiency under the visible light. However, in the doping type titanium catalytic material prepared by using the traditional method, the catalyst is easily aggregated to form large particles, leading to small specific surface area and reduced photocatalytic activity. Moreover, the traditional preparation method is complicated to operate, long in period and high in energy consumption. Meanwhile, when the organic wastewater is treated with the doping type titanium catalytic material, the efficiency is low, organic pollutants are not thoroughly degraded, secondary pollution is easily caused, and the catalyst is easy to inactivate.

SUMMARY

The objective of the present application is to provide an organic wastewater treatment method based on a multi-element co-doping $TiO_2$ nano photocatalytic material to overcome the defects in the prior art.

In order to realize the above objective, the present application provides the following technical solution:

The embodiment of the present application provides an organic wastewater treatment method based on a multi-element co-doping $TiO_2$ nano photocatalytic material, comprising:

(1) successively adding butyl titanate and titanium disulfide into absolute ethyl alcohol, continuously stirring until dropwise addition is completed, then dropwise adding a nitric acid solution, and stirring for 1-2 h in water bath at 30-60° C. to obtain a sulfur-titanium dioxide mixture;

(2) adding the sulfur-titanium dioxide mixture into a copper chloride solution, and successively adding an alkaline aqueous solution and a transition metal salt aqueous solution, transferring the above mixture into a hydrothermal reactor, and continuously reacting for 10-20 h at 150-160° C.;

(3) performing suction filtration on the reaction mixture obtained in step (2), washing the obtained filter cake to be neutral with deionized water, drying for 1-2 h in vacuum at 60-80° C., uniformly mixing the dried filter cake with a hydrofluoric acid solution to form a paste, putting the paste into a closed reaction vessel, heating to 120-140° C. at the rate of 3-5° C./min, and preserving for 0.5-1 h;

(4) slowly heating the product obtained in step (3) to 200-250° C. at the rate of 1-2° C./min and preserving for 0.5-1 h, then rapidly heating to 300-400° C. at the rate of 8-12° C./min and maintaining for 2-3 h, so as to obtain the multi-element co-doping $TiO_2$ nano photocatalytic material; and (5) evenly dispersing the multi-element co-doping $TiO_2$ nano photocatalytic material into organic wastewater and continuously irradiating the organic wastewater with sun light so that organic pollutants in the organic wastewater are photo-catalytically degraded into carbon dioxide and water.

Further, a volume ratio of butyl titanate to absolute ethyl alcohol to nitric acid solution in step (1) is 3-5:12-15:1.

Further, the concentration of the nitric acid solution in step (1) is 1 mol/L-2 mol/L.

Further, a volume-to-mass ratio of butyl titanate to titanium disulfide is 1 mL: 1-5 g.

Further, the stirring rate in step (1) is 300-500 r/min.

Further, the concentration of the copper chloride solution in step (2) is 1~4 mol/L, the alkaline aqueous solution contains 3-5 mol/L $NH_3$ and 1-2 mol/L NaOH, and the transition metal salt aqueous solution contains 0.1-0.5 mol/L $ZnCl_2$ and 0.2-0.3 mol/L $FeCl_3$.

Further, a volume ratio of copper chloride solution to alkaline aqueous solution to transition metal salt aqueous solution in step (2) is 10-20:5-8:1-2.

Further, the concentration of the hydrofluoric acid solution in step (3) is 0.1-0.5 mol/L.

Further, in step (5), if the organic wastewater also contains ammonia nitrogen pollutants, the ammonia nitrogen pollutants in the organic wastewater can be photo-catalytically degraded to form nitrogen to be removed when the multi-element co-doping $TiO_2$ nano photocatalytic material is uniformly dispersed into the organic wastewater and the organic wastewater is continuously irradiated with sun light.

In some embodiments, the organic wastewater treatment method further comprises: after step (5) is completed, separating the multi-element co-doping $TiO_2$ nano photocatalytic material from the organic wastewater and naturally drying in air, and then calcining for 0.5-2 h in air at the calcination temperature of 350-450° C. to regenerate the multi-element co-doping $TiO_2$ nano photocatalytic material.

Further, the organic wastewater treatment method specifically comprises: rapidly heating the multi-element co-doping $TiO_2$ nano photocatalytic material separated from the organic wastewater to 350-450° C. after naturally drying in air, and then calcining for 0.5-1 h at the rate of 20-30° C./min.

Compared with the prior art, the present application at least has the following advantages:

(1) the provided multi-element co-doping $TiO_2$ nano photocatalytic material is a hollow sphere with a particle size of 40 nm-150 nm, has a large specific surface area (about 195.463-212.168 $m^2/g$) and small density, is easy to uniformly disperse into a water phase system, can realize full-spectrum absorption of sun light, degrades organic dye, ammonia nitrogen and the like in a water body to form carbon dioxide, nitrogen and water and can be regenerated only by simple calcination after being recycled, and the photocatalytic property after regeneration can reach more than 90% of initial photocatalytic property; and (2) the provided organic wastewater treatment method is efficient and rapid, safe and environmental-friendly, is capable of completely degrading multiple organic pollutants and ammonia nitrogen in the organic wastewater and does not cause secondary pollution, and the cost is inexpensive.

BRIEF DESCRIPTION OF THE DRAWINGS

FIGURE is a scanning electron microscope (SEM) image of a multi-element co-doping $TiO_2$ nano photocatalytic material prepared in example 1 of the present application.

DETAILED DESCRIPTION OF THE EMBODIMENTS

The present application will be further described through the following examples. According to the following examples, the present application can be better understood. However, those skilled in the art easily understand that specific material ratios, process conditions and results described in examples are only for illustrating the present application, but not limiting the present application described in claims in detail.

Example 1 An organic wastewater treatment method based on a multi-element co-doping $TiO_2$ nano photocatalytic material comprises:

(1) butyl titanate and titanium disulfide were successively added into absolute ethyl alcohol and continuously stirred until dropwise addition was completed, then a 1 mol/L nitric acid solution was dropwise added, and the above mixture was stirred for 1 h in water bath at 30° C. at the rate of 300 r/min to obtain a sulfur-titanium dioxide mixture, wherein a volume ratio of butyl titanate to absolute ethyl alcohol to nitric acid solution was 3:12:1, and a volume-to-mass ratio of butyl titanate to titanium disulfide was 1 mL: 1 g;

(2) the sulfur-titanium dioxide mixture was added into a 1 mol/L copper chloride solution, and an alkaline aqueous solution containing 3 mol/L $NH_3$ and 1 mol/L NaOH and a transition metal salt aqueous solution containing 0.1 mol/L $ZnCl_2$ and 0.2 mol/L $FeCl_3$ were successively added, wherein a volume ratio of copper chloride solution to alkaline aqueous solution to transition metal salt aqueous solution was 10:5:1, and the above mixture was then transferred into a hydrothermal reactor and continuously reacted for 10 h at 150° C.;

(3) suction filtration was performed on the reaction mixture obtained in step (2), the obtained filter cake was washed to be neutral with deionized water, dried for 1 h in vacuum at 80° C., then uniformly mixed with a 0.1 mol/L hydrofluoric acid solution to form a paste, and the paste was put into a closed reaction vessel, heated to 120° C. at the rate of 3° C./min and preserved for 0.5 h;

(4) the product obtained in step (3) was slowly heated to 200° C. at the rate of 1° C./min in air and preserved for 0.5 h, then rapidly heated to 300° C. at the rate of 8° C./min and maintained for 2 h, so as to obtain the multi-element co-doping $TiO_2$ nano photocatalytic material; the morphology of the nano photocatalytic material can be seen in FIGURE, is a hollow sphere with a particle size of 40 nm-150 nm and has a large specific surface area of about 203.257 $m^2/g$, its EDS energy spectrum test result show that the content of Cu is about 9.23 wt %, the content of Fe is about 4.63 wt %, the content of Zn is about 2.06 wt %, the content of S is about 6.28 wt %, the content of F is about 7.24 wt %, the content of 0 is about 13.78 wt %, and the balance is Ti, and its XRD test results show that $TiO_2$ is anatase;

(5) the multi-element co-doping $TiO_2$ nano photocatalytic material was directly and evenly dispersed into a 0.1 wt % rhodamine B solution, a mass-to-volume ratio of nano photocatalytic material to rhodamine B solution was 1 g: 100 mL, the organic wastewater was continuously irradiated with sun light, the rhodamine B solution was turned into be colorless after 7 h, enhanced Raman spectrum detection was performed on the colorless solution, the results showed that rhodamine B and other organic matters were not left, and the concentration of carbon dioxide in the colorless solution was measured by using a titrimetric method and obviously increased.

Example 2 An organic wastewater treatment method based on a multi-element co-doping $TiO_2$ nano photocatalytic material comprises:

(1) butyl titanate and titanium disulfide were successively added into absolute ethyl alcohol and continuously stirred until dropwise addition was completed, then a 2 mol/L nitric acid solution was dropwise added, and the above mixture was stirred for 2 h in water bath at 60° C. at the rate of 500 r/min to obtain a sulfur-titanium dioxide mixture, wherein a volume ratio of butyl titanate to absolute ethyl alcohol to nitric acid solution was 5:15:1, and a volume-to-mass ratio of butyl titanate to titanium disulfide was 1 mL: 5 g;

(2) the sulfur-titanium dioxide mixture was added into a 4 mol/L copper chloride solution, and an alkaline aqueous solution containing 5 mol/L $NH_3$ and 2 mol/L NaOH and a transition metal salt aqueous solution containing 0.5 mol/L $ZnCl_2$ and 0.3 mol/L $FeCl_3$ were successively added, wherein a volume ratio of copper chloride solution to alkaline aqueous solution to transition metal salt aqueous solution was 20:8:2, and the above mixture was then transferred into a hydrothermal reactor and continuously reacted for 20 h at 160° C.;

(3) suction filtration was performed on the reaction mixture obtained in step (2), the obtained filter cake was washed to be neutral with deionized water, dried for 2 h in vacuum at 60° C., then uniformly mixed with a 0.5 mol/L hydrofluoric acid solution to form a paste, and the paste was put into a closed reaction vessel, heated to 140° C. at the rate of 5° C./min and preserved for 1 h;

(4) the product obtained in step (3) was slowly heated to 250° C. at the rate of 2° C./min in air and preserved for 1 h, then rapidly heated to 400° C. at the rate of 12° C./min and maintained for 2 h, so as to obtain the multi-element co-doping $TiO_2$ nano photocatalytic material;

(5) the multi-element co-doping $TiO_2$ nano photocatalytic material was evenly dispersed into an aqueous solution containing 20 mg/mL methyl blue, a mass-to-volume ratio of nano photocatalytic material to methyl blue aqueous solution was 1 g: 100 mL, the methyl blue aqueous solution was continuously irradiated with sun light, the methyl blue aqueous solution was turned into be colorless after 5 h, enhanced Raman spectrum detection was performed on the colorless solution, the results showed that methyl blue and other organic matters were not left, and the concentration of carbon dioxide in the colorless solution was measured by using a titrimetric method and obviously increased.

Example 3 An organic wastewater treatment method based on a multi-element co-doping $TiO_2$ nano photocatalytic material comprises:

(1) butyl titanate and titanium disulfide were successively added into absolute ethyl alcohol and continuously stirred until dropwise addition was completed, then a 2 mol/L nitric acid solution was dropwise added, and the above mixture was stirred for 2 h in water bath at 40° C. at the rate of 400 r/min to obtain a sulfur-titanium dioxide mixture, wherein a volume ratio of butyl titanate to absolute ethyl alcohol to nitric acid solution was 4:14:1, and a volume-to-mass ratio of butyl titanate to titanium disulfide was 1 mL: 3 g;

(2) the sulfur-titanium dioxide mixture was added into a 2 mol/L copper chloride solution, and an alkaline aqueous solution containing 4 mol/L $NH_3$ and 2 mol/L NaOH and a transition metal salt aqueous solution containing 0.4 mol/L $ZnCl_2$ and 0.3 mol/L $FeCl_3$ were successively added, wherein a volume ratio of copper chloride solution to alkaline aqueous solution to transition metal salt aqueous solution was 15:6:2, and the above mixture was then transferred into a hydrothermal reactor and continuously reacted for 15 h at 160° C.;

(3) suction filtration was performed on the reaction mixture obtained in step (2), the obtained filter cake was washed to be neutral with deionized water, dried for 2 h in vacuum at 70° C., then uniformly mixed with a 0.3 mol/L hydrofluoric acid solution to form a paste, and the paste was put into a closed reaction vessel, heated to 140° C. at the rate of 4° C./min and preserved for 1 h;

(4) the product obtained in step (3) was slowly heated to 220° C. at the rate of 2° C./min in air and preserved for 1 h, then rapidly heated to 350° C. at the rate of 10° C./min and maintained for 2 h, so as to obtain the multi-element co-doping $TiO_2$ nano photocatalytic material;

(5) the multi-element co-doping $TiO_2$ nano photocatalytic material was evenly dispersed into an aqueous solution containing 20 mg/mL neutral red, a mass-to-volume ratio of nano photocatalytic material to neutral red aqueous solution was 1 g: 100 mL, the neutral red aqueous solution was continuously irradiated with sun light, the neutral red aqueous solution was turned into be colorless after 8 h, enhanced Raman spectrum detection was performed on the colorless solution, the results showed that neutral red and other organic matters were not left, and the concentration of carbon dioxide in the colorless solution was measured by using a titrimetric method and obviously increased.

Example 4 An organic wastewater treatment method based on a multi-element co-doping $TiO_2$ nano photocatalytic material comprises:

Steps (1)-(4) are the same as those in example 1.

(5) the multi-element co-doping $TiO_2$ nano photocatalytic material was directly and evenly dispersed into a peach blossom aqueous solution containing 0.1 wt % rhodamine B solution and 150 mg/L $NH_3$—N, a mass-to-volume ratio of nano photocatalytic material to peach blossom aqueous solution was 1 g: 100 mL, the organic wastewater was continuously irradiated with sun light, the peach blossom aqueous solution was turned into be colorless after 4 h, enhanced Raman spectrum detection was performed on the colorless solution, the results showed that rhodamine B or other organic matters and ammonia nitrogen or nitrite ions were not left.

Example 5

Steps (1)-(5) are the same as those in example 1.

(6) after step (5) was completed, the multi-element co-doping $TiO_2$ nano photocatalytic material in the aqueous solution was separated out by high-rate centrifugation (a rotation rate of a centrifuge was 20000 r/min, and the time is 5 min), the operation of step (5) was carried out again on the multi-element co-doping $TiO_2$ nano photocatalytic material and repeated for 50 times, and then a part of the multi-element co-doping $TiO_2$ nano photocatalytic material was inactivated;

(7) after step (6) was completed, the multi-element co-doping $TiO_2$ nano photocatalytic material was separated out by high-rate centrifugation and naturally dried in air, then the dried multi-element co-doping $TiO_2$ nano photocatalytic material was rapidly heated to 450° C. at the rate of 30° C./min and calcined for 0.5 h, so that the multi-element co-doping $TiO_2$ nano photocatalytic material was regenerated.

The property of the regenerated multi-element co-doping $TiO_2$ nano photocatalytic material was tested using the operation of step (5). The results show that the catalytic efficiency is maintained to about 92% of that of a freshly prepared multi-element co-doping $TiO_2$ nano photocatalytic material.

Example 6

Steps (1)-(6) are the same as those in example 1.

The difference is that in step (7), the multi-element co-doping $TiO_2$ nano photocatalytic material is regenerated by heating to 350° C. at the rate of 20° C./min in air and calcining for 1 h.

Finally, it is also noted that terms "include", "comprise" or other any variants are intended to cover non-exclusive inclusion, processes, methods, articles or equipment including a series of elements include not only those elements but also other elements that are not explicitly list, or elements inherent to such the processes, methods, articles or equipment.

What is claimed is:

1. An organic wastewater treatment method based on a multi-element co-doping $TiO_2$ nano photocatalytic material, comprising:

(1) successively adding butyl titanate and titanium disulfide into absolute ethyl alcohol, continuously stirring until a dropwise addition is completed, then dropwise adding a nitric acid solution, and stirring for 1-2 h in a water bath at 30-60° C. to obtain a sulfur-titanium dioxide mixture;

(2) adding the sulfur-titanium dioxide mixture into a copper chloride solution, and successively adding an alkaline aqueous solution and a transition metal salt aqueous solution to obtain a mixture, transferring the obtained mixture into a hydrothermal reactor, and continuously reacting for 10-20 h at 150-160° C.;

(3) performing a suction filtration on a reaction mixture obtained in step (2) to obtain a filter cake washing the obtained filter cake to be neutral with a deionized water, drying for 1-2 h in a vacuum at 60-80° C. to obtain dried filter cake, uniformly mixing the dried filter cake with a hydrofluoric acid solution to form a paste, putting the paste into a closed reaction vessel, then heating to 120-140° C. at a rate of 3-5° C./min, and preserving for 0.5-1 h;

(4) slowly heating a product obtained in step (3) to 200-250° C. at a rate of 1-2° C./min and preserving for 0.5-1 h, then rapidly heating to 300-400° C. at a rate of 8-12° C./min and maintaining for 2-3 h, to obtain the multi-element co-doping $TiO_2$ nano photocatalytic material; and (5) evenly dispersing the multi-element co-doping $TiO_2$ nano photocatalytic material into an organic wastewater, and continuously irradiating the organic wastewater with a sun light to photo-catalytically degrade organic pollutants in the organic wastewater into carbon dioxide and water.

2. The organic wastewater treatment method according to claim 1, wherein a volume ratio of the butyl titanate to the absolute ethyl alcohol to the nitric acid solution is 3-5:12-15:1.

3. The organic wastewater treatment method according to claim 2, wherein a concentration of the nitric acid solution in step (1) is 1 mol/L-2 mol/L.

4. The organic wastewater treatment method according to claim 1, wherein a concentration of the nitric acid solution in step (1) is 1 mol/L-2 mol/L.

5. The organic wastewater treatment method according to claim 1, wherein a volume-to-mass ratio of the butyl titanate to the titanium disulfide in step (1) is 1 mL:1-5 g.

6. The organic wastewater treatment method according to claim 1, wherein a stirring rate in step (1) is 300-500 r/min.

7. The organic wastewater treatment method according to claim 1, wherein a concentration of the copper chloride solution in step (2) is 1-4 mol/L, the alkaline aqueous solution contains 3-5 mol/L $NH_3$ and 1-2 mol/L NaOH, and the transition metal salt aqueous solution contains 0.1-0.5 mol/L $ZnCl_2$ and 0.2-0.3 mol/L $FeCl_3$.

8. The organic wastewater treatment method according to claim 7, wherein a volume ratio of the copper chloride solution to the alkaline aqueous solution to the transition metal salt aqueous solution in step (2) is 10-20: 5-8:1-2.

9. The organic wastewater treatment method according to claim 1, wherein a volume ratio of the copper chloride solution to the alkaline aqueous solution to the transition metal salt aqueous solution in step (2) is 10-20: 5-8:1-2.

10. The organic wastewater treatment method according to claim 1, wherein a concentration of the hydrofluoric acid solution in step (3) is 0.1-0.5 mol/L.

11. The organic wastewater treatment method according to claim 1, further comprising: after step (5) is completed, separating the multi-element co-doping $TiO_2$ nano photocatalytic material from the organic wastewater and naturally drying in air, and then calcining for 0.5-2 h in air at a calcination temperature of 350-450° C. to regenerate the multi-element co-doping $TiO_2$ nano photocatalytic material.

12. The organic wastewater treatment method according to claim 11, specifically comprising: rapidly heating the multi-element co-doping $TiO_2$ nano photocatalytic material separated from the organic wastewater to 350-450° C. after naturally drying in air, and then calcining for 0.5-1 h at a rate of 20-30° C./min.

* * * * *